US009133306B2

(12) United States Patent
Vedage et al.

(10) Patent No.: US 9,133,306 B2
(45) Date of Patent: Sep. 15, 2015

(54) AMINE COMPOSITION

(75) Inventors: Gamini Ananda Vedage, Bethlehem, PA (US); Juan Jesus Burdeniuc, Colmar, PA (US); Eugene George Lutz, Lenhartsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1922 days.

(21) Appl. No.: 11/740,307

(22) Filed: Apr. 26, 2007

(65) Prior Publication Data

US 2008/0275191 A1    Nov. 6, 2008

(51) Int. Cl.
| | | |
|---|---|---|
| C07C 211/00 | (2006.01) | |
| C08G 73/06 | (2006.01) | |
| C08F 283/00 | (2006.01) | |
| C08G 73/02 | (2006.01) | |
| C08L 79/02 | (2006.01) | |

(52) U.S. Cl.
CPC ............ *C08G 73/0206* (2013.01); *C08G 73/02* (2013.01); *C08L 79/02* (2013.01); *C08L 2205/02* (2013.01)

(58) Field of Classification Search
CPC .................................................. C07C 211/13
USPC .......... 525/417; 564/512, 336, 372, 391, 392, 564/453, 1; 528/423
See application file for complete search history.

(56) References Cited

U.S. PATENT DOCUMENTS

| | | | |
|---|---|---|---|
| 3,420,794 A | 1/1969 | May et al. | |
| 4,126,640 A | 11/1978 | Floyd | |
| 4,143,003 A * | 3/1979 | Haas et al. ..................... | 521/129 |
| 4,514,530 A | 4/1985 | Sellstrom et al. | |
| 4,574,143 A | 3/1986 | Sellstrom et al. | |
| 4,967,008 A | 10/1990 | Friedli et al. | |
| 5,426,157 A | 6/1995 | Starner et al. | |
| 6,077,886 A | 6/2000 | Hayes et al. | |
| 6,908,982 B2 * | 6/2005 | Ichikawa et al. .............. | 528/124 |
| 2008/0004362 A1 | 1/2008 | Masuda et al. | |
| 2008/0090922 A1 | 4/2008 | Vedage et al. | |
| 2008/0188591 A1* | 8/2008 | Raymond et al. ............. | 523/416 |
| 2008/0194776 A1 | 8/2008 | Walker et al. | |
| 2008/0275191 A1 | 11/2008 | Vedage et al. | |

FOREIGN PATENT DOCUMENTS

| | | |
|---|---|---|
| EP | 1 914 254 A | 4/2008 |
| EP | 1 914 257 A | 4/2008 |
| JP | 10-130463 A | 5/1998 |
| JP | 11-060694 A2 | 3/1999 |
| JP | 11-199548 A | 7/1999 |
| JP | 2006-152281 A | 6/2006 |
| JP | 2008-111118 A | 5/2008 |
| JP | 2008-156605 A | 7/2008 |
| KR | 101257986 | 4/2013 |
| WO | WO 2006/049182 * | 5/2006 |

OTHER PUBLICATIONS

English language machine translation of JP 11-060694. Translation printed Jun. 16, 2010, original document published Mar. 2, 1999.*
Albarella et al., Monoadduct forming photochemical reagents for labeling nucleic acids for hybridization, 1989, Nucleic Acids Research, vol. 17, No. 11, pp. 4293-4305.*
O'Neill, L. A., et al., "Chemical and Spectroscopic Studies of Epoxy Resin Reactions in the Surfae Coating Field," Journal of Applied Chemistry, 6, pp. 356-364 (1956).
Shechter, L., et al., "Chemistry of Styrene Oxide," Ind. Eng. Chem., 49, pp. 1107-1109 (1957).
Shechter, L., et al., "Glycidyl Ether Reactions with Amines," Ind. Eng. Chem., 48, pp. 94-97 (1956).
Kakurai, T., et al., "Reaction Velocity of Epoxy Compounds with Amines," J. Soc. Org. Syn. Chem. Jpn., 18, p. 485-495 (1960)—Abstract.
Laakso; "Preparation of N.N.N'.N-Tetrasubstituted Diamines"; Journal of the American Chemical Society; vol. 73; 1951; pp. 3518-3520; XP002491900.
Tanaka, Y, "Synthesis and Characteristics of Epoxides," C.A. May, ed., Epoxy Resins Chemistry and Technology (Marcel Dekker, 1988) p. 52-73.
Rompp Lexikon Chemie: Band 4, Ed. Jurgen Falbe, Manfred Regitz, 10th Edition, Stuttgart New York, Thieme Verlag 1998, p. 3010, col. 1).

* cited by examiner

*Primary Examiner* — Megan McCulley
(74) *Attorney, Agent, or Firm* — Michael K. Boyer

(57) ABSTRACT

The present invention provides novel polymeric amine compositions employing amine compounds having multiple tertiary amine groups. Methods of making these new compositions are also disclosed. Amine compositions and amine-epoxy compositions employing the polymeric amine compositions of the present invention are also provided.

9 Claims, No Drawings

AMINE COMPOSITION

BACKGROUND OF THE INVENTION

The present invention relates generally to polymeric amine compositions. More specifically, the present invention relates to amine compounds, amine and amine-epoxy compositions employing such amine compounds, and methods of making polymeric amine compositions.

Certain epoxy resins which are cured, hardened, and/or crosslinked with amine-based curing agents are known. These amine-epoxy materials are widely used in applications ranging from coatings, adhesives, and composites, to civil engineering applications such as formulations for concrete flooring.

It can be beneficial to limit the volatility of the amine component in an amine-epoxy formulation. In addition to meeting volatile organic compound (VOC) regulations, reducing volatility can reduce worker exposure and safety concerns. The presence of multiple primary amine groups in an amine compound allows the compound to be chemically bound during the amine-epoxy crosslinking or curing reaction, thereby eliminating the possibility of amine emissions from the cured finished product. Additionally, tertiary amine groups open the epoxy functionality and catalyze the curing of epoxy resins.

Likewise, it is beneficial to limit the volatility of polyurethane catalysts and chain extenders. The presence of multiple primary amine groups in an amine compound allows a polyurethane catalyst to be chemically bound during a polyurethane gel or foam crosslinking reaction, for example. The resultant product will be substantially free of volatile amine emissions. Additionally, compounds with tertiary amine groups are known to be useful catalysts for urethane reactions.

Thus, for both epoxy and urethane applications, it is desirable to produce compounds or compositions having multiple tertiary amine groups. Additionally, it is beneficial for these compounds and compositions to also contain primary amine groups. Accordingly, it is to these ends that the polymeric amine compositions of the present invention are directed.

BRIEF SUMMARY OF THE INVENTION

The present invention discloses novel polymeric amine compositions comprising amine compounds, and methods of making these compositions. These polymeric amine compositions have a number-average molecular weight ($M_n$) from about 250 to about 1500. Such compositions can be used as amine-based curing agents in amine-epoxy compositions and as catalysts or chain extenders in urethane applications.

Polymeric amine compositions in accordance with the present invention comprise amine compounds having the following formula:

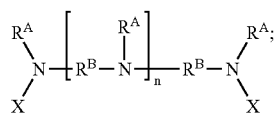

(I)

wherein:

each $R^A$ independently is an unsubstituted $C_5$-$C_6$ cycloalkyl or a substituted or unsubstituted $C_1$-$C_{12}$ linear or branched alkyl, wherein the substituents on the alkyl independently are —$N(CH_3)_2$, —$N(CH_2CH_3)_2$,

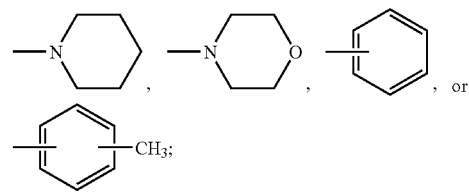

each $R^B$ independently is an unsubstituted $C_3$-$C_8$ linear or branched alkanediyl or

wherein p and q independently are 1, 2, 3, 4, 5, or 6;

each X independently is $R^C$—$NH_2$, $R^D$—OH, or $R^E$—H;

$R^C$ is an unsubstituted $C_3$-$C_{10}$ linear or branched alkanediyl or

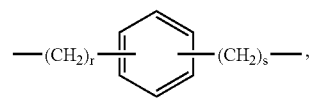

wherein r and s independently are 1 or 2;

$R^D$ is —$CH_2CHR^Y$—, wherein $R^Y$ is a hydrogen atom, a methyl group, an ethyl group, a benzyl group, a phenyl group, a tolyl group, or $CH_2OR^Z$, wherein $R^Z$ is a phenyl group or an unsubstituted $C_1$-$C_{18}$ linear or branched alkyl;

$R^E$ is an unsubstituted $C_1$-$C_8$ linear or branched alkanediyl; and n is an integer in a range from 0 to 50, inclusive.

An amine curing agent composition is provided in another aspect of the present invention. An amine curing agent composition in accordance with the present invention can be used to cure, harden, or crosslink an epoxy resin. Such a composition can comprise the polymeric amine composition as disclosed immediately above and at least one multifunctional amine having 2 or more active amine hydrogens.

Yet, in another aspect, the present invention provides an amine-epoxy composition comprising the contact product of:
(a) a polymeric amine curing agent composition comprising amine compounds compound having the formula:

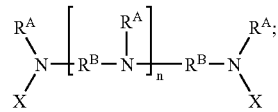

(I)

wherein:

each $R^A$ independently is an unsubstituted $C_5$-$C_6$ cycloalkyl or a substituted or unsubstituted $C_1$-$C_{12}$ linear or branched alkyl, wherein the substituents on the alkyl independently are —$N(CH_3)_2$, —$N(CH_2CH_3)_2$,

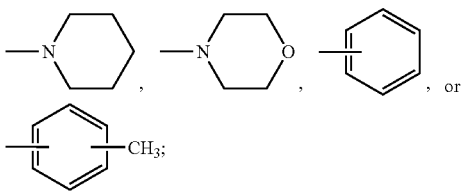

each $R^B$ independently is an unsubstituted $C_3$-$C_8$ linear or branched alkanediyl or

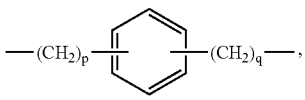

wherein p and q independently are 1, 2, 3, 4, 5, or 6;
each X independently is $R^C$—$NH_2$;
$R^C$ is an unsubstituted $C_3$-$C_{10}$ linear or branched alkanediyl or

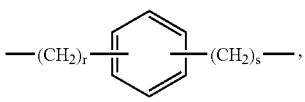

wherein r and s independently are 1 or 2;
the polymeric amine curing agent composition has a $M_n$ from about 250 to about 1500; and
n is an integer in a range from 0 to 50, inclusive; and
(b) an epoxy component comprising at least one multifunctional epoxy resin.

In a further aspect, the present invention provides a method for curing the amine-epoxy composition as indicated above. In this aspect, the polymeric amine curing agent composition can further comprise at least one multifunctional amine having 2 or more active amine hydrogens.

The present invention also includes articles of manufacture comprising an amine-epoxy composition. Such articles can include, but are not limited to, a coating, an adhesive, a construction product, a flooring product, or a composite product. Additional components or additives can be used together with the compositions of the present invention to produce articles of manufacture.

In accordance with the present invention, methods of making these novel polymeric amine compositions are disclosed. A method for making such polymeric amine compositions, which have a $M_n$ from about 250 to about 1500, comprises:
A. combining a first primary amine with an α,β-unsaturated ketone, aldehyde, or first nitrile to form an intermediate ketone, aldehyde, or first nitrile;
B. introducing the intermediate ketone, aldehyde, or first nitrile to a first liquid phase containing a second primary amine in the presence of hydrogen to form a secondary diamine polymer, wherein the second primary amine can be the same as or different from the first primary amine;
C. combining the secondary diamine polymer with an α,β-unsaturated second nitrile to form bis-cyanoethylated compounds, wherein the second nitrile can be the same as or different from the first nitrile; and
D. introducing the bis-cyanoethylated compounds to a second liquid phase in the presence of hydrogen to form the polymeric amine composition.

In another aspect of the present invention, a method for making a polymeric amine composition having a $M_n$ from about 250 to about 1500 comprises:
A. adding one of a first primary amine and an α,β-unsaturated ketone, aldehyde, or first nitrile to the other in a reactor by delayed addition mode at about 40° C. to 80° C. in a ketone, aldehyde, or first nitrile to first primary amine molar ratio of about 0.6:1 to about 2.2:1 to form an intermediate ketone, aldehyde, or first nitrile;
B. adding the intermediate ketone, aldehyde, or first nitrile to a first liquid phase containing a second primary amine at about 70° C. to about 150° C. in a weight ratio of about 0.1:1 to about 0.75:1 of the second primary amine to the total intermediate ketone, aldehyde, or first nitrile feed, in the presence of a hydrogenation catalyst and hydrogen at a pressure of about 1.38 to about 20.7 MPa (about 200 to about 3000 psig) to form a secondary diamine polymer, wherein the second primary amine can be the same as or different from the first primary amine;
C. adding one of the secondary diamine polymer and an α,β-unsaturated second nitrile to the other in a reactor by delayed addition mode at about 40° C. to 80° C. in a second nitrile to secondary diamine polymer molar ratio of about 0.6:1 to about 3:1 to form bis-cyanoethylated compounds, wherein the second nitrile can be the same as or different from the first nitrile; and
D. adding the bis-cyanoethylated compounds to a second liquid phase at about 70° C. to about 150° C. in the presence of a hydrogenation catalyst and hydrogen at a pressure of about 1.38 to about 20.7 MPa (about 200 to about 3000 psig) to form the polymeric amine composition.

These methods result in a novel polymeric amine composition which comprises amine compounds having the formula (I), wherein $R^A$, $R^B$, and n are as defined above and X is $R^C$—$NH_2$.

In another aspect, oxygen-containing moieties, such as ethylene oxide, propylene oxide, and glycidyl ethers, are reacted with the secondary diamine polymer in Step C. Step D is not employed in this aspect of the invention. The resultant polymeric amine composition comprises amine compounds having hydroxyl functionality. In yet another aspect, Step C is a reductive alkylation reaction of the secondary diamine polymer with an aldehyde in the presence of hydrogen. Step D is not employed in this aspect of the invention. This methodology results in the $R^E$—H moiety in formula (I).

In a different aspect of the present invention, a polymeric amine composition is provided that comprises amine compounds having the formula (I). In this aspect, each $R^A$ is a methyl group, each $R^B$ is an unsubstituted $C_3$ linear alkanediyl (i.e., 1,3-propanediyl), and each X is $R^C$—$NH_2$, wherein $R^C$ is an unsubstituted $C_3$ linear alkanediyl (i.e., 1,3-propanediyl). The polymeric amine composition has a $M_n$ from about 250 to about 1500, and n can be an integer in a range from 0 to 50, inclusive.

The compositions of the present invention have multiple tertiary amine groups, which are useful in both epoxy and urethane applications. In some aspects, the present invention provides compositions that additionally have primary amine groups.

DEFINITIONS

The following definitions and abbreviations are provided in order to aid those skilled in the art in understanding the detailed description of the present invention.
AHEW—amine hydrogen equivalent weight.
CHA—cyclohexylamine.

DGEBA—diglycidyl ether of bisphenol-A.
DMAPA—dimethylaminopropylamine.
EEW—epoxy equivalent weight.
Me—methyl.
MMA—methylamine or $MeNH_2$.
$M_n$—number-average molecular weight.
MPCA—also abbreviated as MBPCAA. MPCA is a mixture of methylene bridged poly(cyclohexyl-aromatic) amines that fits within the class of multifunctional amines. Ancamine® 2168, commercially available from Air Products and Chemicals, Inc., is a MPCA with an AHEW of 57.

DETAILED DESCRIPTION OF THE INVENTION

Amine and Amine-Epoxy Compositions

The present invention discloses novel polymeric amine compositions comprising amine compounds, and methods of making such compositions. These polymeric amine compositions have a number-average molecular weight ($M_n$) from about 250 to about 1500. Polymeric amine compositions in accordance with the present invention comprise amine compounds having the following formula:

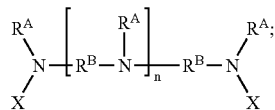
(I)

wherein:

each $R^A$ independently is an unsubstituted $C_5$-$C_6$ cycloalkyl or a substituted or unsubstituted $C_1$-$C_{12}$ linear or branched alkyl, wherein the substituents on the alkyl independently are —$N(CH_3)_2$, —$N(CH_2CH_3)_2$,

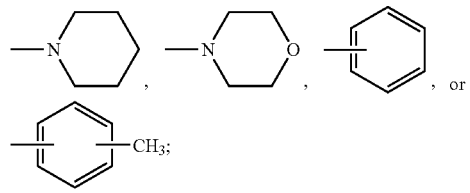

each $R^E$ independently is an unsubstituted $C_3$-$C_8$ linear or branched alkanediyl or

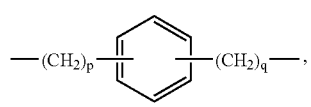

wherein p and q independently are 1, 2, 3, 4, 5, or 6;

each X independently is $R^C$—$NH_2$, $R^D$—OH, or $R^E$—H;

$R^C$ is an unsubstituted $C_3$-$C_{10}$ linear or branched alkanediyl or

wherein r and s independently are 1 or 2;

$R^D$ is —$CH_2CHR^Y$—, wherein $R^Y$ is a hydrogen atom, a methyl group, an ethyl group, a benzyl group, a phenyl group, a tolyl group, or $CH_2OR^Z$, wherein $R^Z$ is a phenyl group or an unsubstituted $C_1$-$C_{18}$ linear or branched alkyl;

$R^E$ is an unsubstituted $C_1$-$C_8$ linear or branched alkanediyl; and n is an integer in a range from 0 to 50, inclusive.

An amine curing agent composition is provided in another aspect of the present invention. An amine curing agent composition in accordance with the present invention can be used to cure, harden, or crosslink an epoxy resin. Such a composition comprises:

(i) a polymeric amine composition comprising amine compounds having the formula (I), wherein $R^A$, $R^B$, X, and n are as defined immediately above and the polymeric amine composition has a $M_n$ from about 250 to about 1500; and (ii) at least one multifunctional amine having 2 or more active amine hydrogens.

The relative amount of the polymeric amine composition versus that of the multifunctional amine can vary depending upon, for example, the end-use article, its desired properties, and the fabrication method and conditions used to produce the end-use article.

Yet, in another aspect, the present invention provides an amine-epoxy composition comprising the contact product of:

(a) a polymeric amine curing agent composition comprising amine compounds compound having the formula:

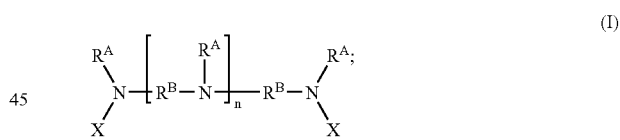
(I)

wherein:

each $R^A$ independently is an unsubstituted $C_5$-$C_6$ cycloalkyl or a substituted or unsubstituted $C_1$-$C_{12}$ linear or branched alkyl, wherein the substituents on the alkyl independently are —$N(CH_3)_2$, —$N(CH_2CH_3)_2$,

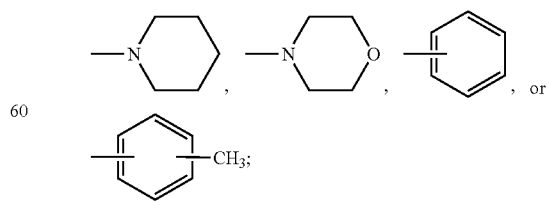

each $R^B$ independently is an unsubstituted $C_3$-$C_8$ linear or branched alkanediyl or

wherein p and q independently are 1, 2, 3, 4, 5, or 6;
each X independently is $R^C$—$NH_2$;
$R^C$ is an unsubstituted $C_3$-$C_{10}$ linear or branched alkanediyl or

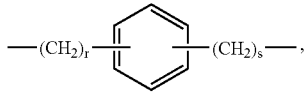

wherein r and s independently are 1 or 2;
the polymeric amine curing agent composition has a $M_n$ from about 250 to about 1500; and
n is an integer in a range from 0 to 50, inclusive; and
(b) an epoxy component comprising at least one multifunctional epoxy resin.

In a further aspect, the present invention provides a method for curing the amine-epoxy composition as indicated above. That is, the amine-epoxy composition comprises the contact product of a polymeric amine curing agent composition and an epoxy component. In this aspect, the polymeric amine curing agent composition can further comprise at least one multifunctional amine having 2 or more active amine hydrogens. Alternatively, the multifunctional amine can have 3 or more active amine hydrogens.

The present invention also includes articles of manufacture comprising an amine-epoxy composition. The amine-epoxy composition comprises the contact product of a polymeric amine curing agent composition and an epoxy component. Such articles can include, but are not limited to, a coating, an adhesive, a construction product, a flooring product, or a composite product. Additional components or additives can be used together with the compositions of the present invention to produce articles of manufacture.

In accordance with the amine-epoxy compositions disclosed herein, the stoichiometric ratio of epoxy groups in the epoxy component to reactive hydrogens in the polymeric amine curing agent compositions ranges from about 1.5:1 to about 1:1.5. In another aspect, the stoichiometric ratio ranges from about 1.3:1 to about 1:1.3.

The present invention also provides a method of making an epoxy resin composition comprising:
(a) forming an amine component comprising:
(i) a polymeric amine curing agent composition comprising amine compounds having the formula (I); wherein $R^A$, $R^B$, and n are as defined above; each X independently is $R^C$—$NH_2$, wherein $R^C$ is an unsubstituted $C_3$-$C_{10}$ linear or branched alkanediyl or

wherein r and s independently are 1 or 2; and the polymeric amine curing agent composition has a $M_n$ from about 250 to about 1500; and (ii) at least one multifunctional amine having 3 or more active amine hydrogens; and
(b) contacting the amine component with at least one multifunctional epoxy resin at a stoichiometric ratio of epoxy groups in the multifunctional epoxy resin to amine hydrogens in the amine component ranging from about 1.5:1 to about 1:1.5.

Applicants disclose several types of ranges in the present invention. These include, but are not limited to, a range of number of atoms, a range of integers, a range of molecular weights, a range of amine hydrogen equivalent weights, a range of stoichiometric ratios, and a range of temperatures. When Applicants disclose or claim a range of any type, Applicants' intent is to disclose or claim individually each possible number that such a range could reasonably encompass, as well as any sub-ranges and combinations of sub-ranges encompassed therein. For example, when the Applicants disclose or claim a chemical moiety having a certain number of carbon atoms, Applicants' intent is to disclose or claim individually every possible number that such a range could encompass, consistent with the disclosure herein. For example, the disclosure that "$R^B$" can be a $C_3$ to $C_8$ alkanediyl group, or in alternative language having from 3 to 8 carbon atoms, as used herein, refers to a "$R^B$" group that can be selected independently from an alkanediyl group having 3, 4, 5, 6, 7, or 8 carbon atoms, as well as any range between these two numbers (for example, a $C_3$ to $C_6$ alkanediyl group), and also including any combination of ranges between these two numbers (for example, a $C_3$ to $C_4$ and $C_6$ to $C_8$ alkanediyl group).

Similarly, another representative example follows for the number-average molecular weight ($M_n$) of the polymeric amine compositions. By a disclosure that the polymeric amine composition has a $M_n$ from about 250 to abut 1500, applicants intend to recite that the $M_n$ can be selected from about 250, about 275, about 300, about 325, about 350, about 375, about 400, about 425, about 450, about 475, about 500, about 525, about 550, about 575, about 600, about 625, about 650, about 675, about 700, about 725, about 750, about 775, about 800, about 825, about 850, about 875, about 900, about 925, about 950, about 975, about 1000, about 1025, about 1050, about 1075, about 1100, about 1125, about 1150, about 1175, about 1200, about 1225, about 1250, about 1275, about 1300, about 1325, about 1350, about 1375, about 1400, about 1425, about 1450, about 1475, or about 1500. Additionally, $M_n$ can be within any range from about 250 to about 1500 (for example, $M_n$ is in a range from about 300 to about 800), and this also includes any combination of ranges between about 250 and about 1500. Likewise, all other ranges disclosed herein should be interpreted in a manner similar to these two examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions or formulations described herein. Combining additional materials or components can be done by any method known to one of skill in the art. Further, the term "contact product" includes mixtures, blends, solutions, slurries, reaction products, and the like, or combinations thereof. Although "contact product" can include reaction products, it is not required for the respective components to react with one another.

While compositions and methods are described in terms of "comprising" various components or steps, the compositions and methods can also "consist essentially of" or "consist of" the various components or steps.

Polymeric Amine Composition

Polymeric amine compositions in accordance with this disclosure comprise amine compounds as illustrated in the following formula:

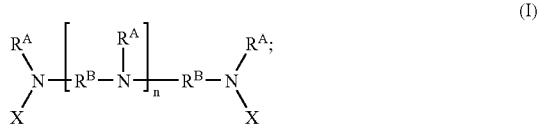

wherein:

each $R^A$ independently is an unsubstituted $C_5$-$C_6$ cycloalkyl or a substituted or unsubstituted $C_1$-$C_{12}$ linear or branched alkyl, wherein the substituents on the alkyl independently are —N(CH$_3$)$_2$, —N(CH$_2$CH$_3$)$_2$,

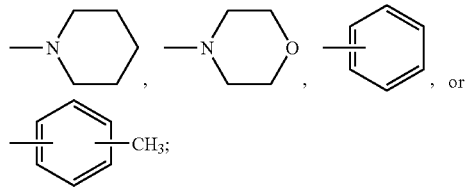

each $R^B$ independently is an unsubstituted $C_3$-$C_8$ linear or branched alkanediyl or

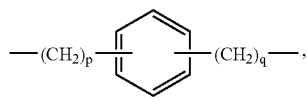

wherein p and q independently are 1, 2, 3, 4, 5, or 6;

each X independently is $R^C$—NH$_2$, $R^D$—OH, or $R^E$—H;

$R^C$ is an unsubstituted $C_3$-$C_{10}$ linear or branched alkanediyl or

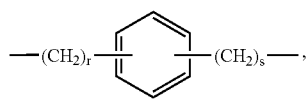

wherein r and s independently are 1 or 2;

$R^D$ is —CH$_2$CHR$^Y$—, wherein $R^Y$ is a hydrogen atom, a methyl group, an ethyl group, a benzyl group, a phenyl group, a tolyl group, or CH$_2$OR$^Z$, wherein $R^Z$ is a phenyl group or an unsubstituted $C_1$-$C_{18}$ linear or branched alkyl;

$R^E$ is an unsubstituted $C_1$-$C_8$ linear or branched alkanediyl; and n is an integer in a range from 0 to 50, inclusive.

Polymeric amine compositions having a $M_n$ from about 250 to about 1500 are within the scope of the present invention. In another aspect, the polymeric amine composition has a $M_n$ in the range from about 275 to about 1200, or from about 300 to about 800. In yet another aspect, the $M_n$ is in a range from about 300 to about 750, from about 300 to about 700, or from about 300 to about 650. In a different aspect, the $M_n$ of the polymeric amine composition is in a range from about 350 to about 650.

The $M_n$ data in accordance with this disclosure, and the data presented in Examples 1 that follows, were determined using a Gas Chromatography (GC) technique as discussed in U.S. patent application Ser. No. 11/584,388, filed on Oct. 20, 2006, which is incorporated herein by reference in its entirety. $M_n$ was determined by assuming that the mass of eluting material was proportional to the area percent obtained by this GC technique. Reaction by-products were not included in the $M_n$ calculation, and only polymeric species with sufficient volatility to elute under the GC conditions given above were included in the calculation. $M_n$ was determined by dividing each area percent (proportional to mass) by the molecular weight of that particular polymeric species to yield the relative moles of that species. The sum of the relative moles of the polymeric species was then divided into the total area percent of the polymeric species to give $M_n$. The total area percent excludes the area percent of reaction by-products. Note that the calculation of $M_n$ of the polymeric sample includes, for example, when the integer n in formula (I) equals zero. As will be recognized by those skilled in the art, as $M_n$ increases, at some point alternative techniques such as Gel Permeation Chromatography (GPC) or High Pressure Liquid Chromatography (HPLC) can be employed for the measurement of $M_n$, due to the low volatility of the higher molecular weight species in the distribution. For some polymeric amine compositions, this occurs when $M_n$ exceeds about 400.

In another aspect of the present invention, the polymeric amine composition can have an amine hydrogen equivalent weight (AHEW) from about 40 to about 500. Alternatively, the polymeric amine composition has an AHEW from about 45 to about 450, from about 50 to about 400, or from about 55 to about 300. In a different aspect, the AHEW of the polymeric amine composition is in a range from about 60 to about 250. By describing $R^B$, $R^C$, and $R^E$ as "alkanediyl" moieties, Applicants are specifying the number of carbon atoms in the respective moiety, along with the number of hydrogen atoms required to conform to the rules of chemical valence for the respective diyl moiety. For example, in formula (I), the fact that $R^B$ is bonded to two other groups is consistent with this description of an alkanediyl moiety.

Unless otherwise specified, alkanediyl groups described herein are intended to include all structural isomers, linear or branched, of a given moiety; for example, all enantiomers and all diasteriomers are included within this definition. As an example, unless otherwise specified, the term propanediyl is meant to include 1,1-propanediyl, 1,2-propanediyl, 1,3-propanediyl, and 2,2-propanediyl. Similarly, butanediyl is meant to include all stereo and region diyl isomers of butane, for example, n-butane-1,1-diyl, n-butane-1,2-diyl, n-butane-1,3-diyl, n-butane-1,4-diyl, n-butane-2,3-diyl, 2-methylpropane-1,1-diyl, 2-methylpropane-1,3-diyl, and so forth.

It is within the scope of the present invention that each $R^A$ independently is an unsubstituted $C_5$-$C_6$ cycloalkyl or a substituted or unsubstituted $C_1$-$C_{12}$ linear or branched alkyl. Substituents on the $C_1$-$C_{12}$ linear or branched alkyl include, but are not limited to, —N(CH$_3$)$_2$, —N(CH$_2$CH$_3$)$_2$,

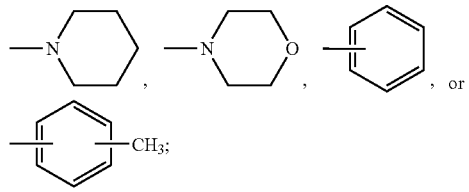

and the like. In another aspect, $R^A$ is a substituted or unsubstituted $C_1$-$C_6$ linear or branched alkyl. Yet, in another aspect, $R^A$ is a methyl group. Non-limiting examples of selections of $R^A$ are illustrated in Examples 1-4 that follow. In Example 1, $R^A$ is a methyl group. $R^A$ is a linear $C_3$ moiety with a —N(CH$_3$)$_2$ substitutent in Constructive Example 2. $R^A$ is a cyclohexyl moiety in Constructive Example 3. In Constructive Example 4, $R^A$ is $C_2$ moiety with a

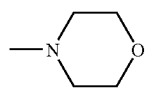

substitutent.

Each $R^B$ independently is an unsubstituted $C_3$-$C_8$ linear or branched alkanediyl or

The integers, p and q, independently are 1, 2, 3, 4, 5, or 6. In one aspect of the present invention, integers p and q are both equal to 1. In another aspect, $R^B$ is an unsubstituted $C_3$-$C_6$ linear or branched alkanediyl. Further, $R^B$ can be an unsubstituted $C_3$ linear alkanediyl (i.e., 1,3-propanediyl) in another aspect of the present invention. Non-limiting examples of selections of $R^B$ are illustrated in the Examples that follow. For instance, $R^B$ is 1,3-propanediyl in Example 1. A branched alkanediyl selection for $R^B$ is illustrated in Constructive Example 8.

When X is $R^C$—NH$_2$, $R^C$ is an unsubstituted $C_3$-$C_{10}$ linear or branched alkanediyl or

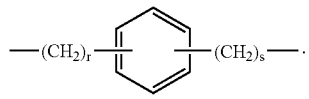

The integers, r and s, independently are 1 or 2. $R^C$ can be an unsubstituted $C_3$-$C_6$ linear or branched alkanediyl in one aspect of the present invention. In another aspect, $R^C$ is an unsubstituted $C_3$ linear alkanediyl (i.e., 1,3-propanediyl). A non-limiting example of the selection of 1,3-propanediyl for $R^C$ is illustrated in Example 1.

When X is $R^D$—OH, $R^D$ is —CH$_2$CHR$^Y$—. In this formula, $R^Y$ is a hydrogen atom, a methyl group, an ethyl group, a benzyl group, a phenyl group, a tolyl group, or CH$_2$OR$^Z$. $R^Z$ is a phenyl group or an unsubstituted $C_1$-$C_{18}$ linear or branched alkyl. $R^Y$, in one aspect of the present invention, is a hydrogen atom, a methyl group, or a phenyl group. Non-limiting examples of selections of $R^D$ are illustrated in Examples 11-13 that follow. $R^Y$ is a hydrogen atom in Constructive Example 11, a methyl group in Constructive Example 12, and CH$_2$OR$^Z$ in Constructive Example 13.

When X is $R^E$—H, $R^E$ is an unsubstituted $C_1$-$C_8$ linear or branched alkanediyl. In one aspect, $R^E$ is an unsubstituted $C_2$-$C_4$ linear alkanediyl. In a different aspect, $R^E$ H is a methyl group.

In another aspect of the present invention, the present invention provides a polymeric amine composition comprising amine compounds having the formula (I); wherein each $R^A$ is a methyl group, each $R^B$ is an unsubstituted $C_3$ linear alkanediyl (i.e., 1,3-propanediyl), each X is $R^C$—NH$_2$, wherein $R^C$ is an unsubstituted $C_3$ linear alkanediyl (i.e., 1,3-propanediyl). The polymeric amine composition, in this aspect, has a number-average molecular weight ($M_n$) from about 250 to about 1500, and n can be an integer in a range from 0 to 50, inclusive.

The polymeric amine compositions of the present invention are described as polymers, indicating that they comprise at least one repeating unit. Applicants' use of the term "polymer" is meant to include all molecular weight polymers, including lower molecular weight polymers or oligomers. Since there is not an industry accepted cutoff in molecular weight between a polymer and an oligomer, Applicants have elected to use the term polymer throughout this disclosure and intend for the term polymer to encompass oligomers as well.

Since the compositions of the present invention are polymeric, they necessarily include mixtures of different size molecules, with different numbers of repeating units. Further, for a polymeric amine composition comprising amine compounds having the formula:

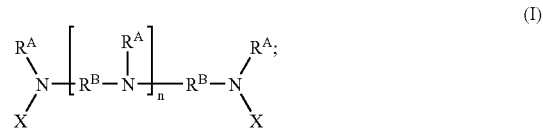

(I)

wherein $R^A$, $R^B$, X are as indicated above, the integer n can be zero.

For instance, the moiety within the brackets of formula (I) illustrates a repeating unit in a given molecule or compound, where the integer "n" represents the number of repeating units in that molecule or compound. Since the polymeric amine composition of the present invention is polymeric, it is represented by a mixture of molecules or compounds of various sizes, i.e., various values of n. It is within the scope of the present invention for the integer n to vary from 0 to 50 or more. In a different aspect, n ranges from 0 to 40, or from 0 to 30, or from 0 to 20, inclusive. In a further aspect, n ranges from 0 to 10, inclusive. In a different aspect, n can range from 1 to 50, from 1 to 40, from 1 to 30, or from 1 to 20, inclusive. Further, n can range from 1 to 10, inclusive, in one aspect of the present invention. It is understood that n represents an integer designating the number of repeating units for a single molecule or compound within the polymeric composition, where the polymeric composition has a distribution of values of n, a distribution of molecular sizes, and a distribution of molecular weights. For any given polymeric amine composition comprising compounds with a repeating moiety as illustrated in formula (I), an average value of n can be readily determined from the number-average molecular weight, $M_n$. Determining an average value of n would not necessarily result in an integer or a whole number, depending upon the respective molecular weight distribution.

In accordance with the present invention, methods of making these novel polymeric amine compositions are disclosed. A method for making a polymeric amine composition having a $M_n$ from about 250 to about 1500 can comprise:

A. combining a first primary amine with an α,β-unsaturated ketone, aldehyde, or first nitrile to form an intermediate ketone, aldehyde, or first nitrile;

B. introducing the intermediate ketone, aldehyde, or first nitrile to a first liquid phase containing a second primary amine in the presence of hydrogen to form a secondary diamine polymer, wherein the second primary amine can be the same as or different from the first primary amine;

C. combining the secondary diamine polymer with an α,β-unsaturated second nitrile to form bis-cyanoethylated compounds, wherein the second nitrile can be the same as or different from the first nitrile; and D. introducing the bis-cyanoethylated compounds to a second liquid phase in the presence of hydrogen to form the polymeric amine composition.

In another aspect of the present invention, a method for making a polymeric amine composition having a $M_n$ from about 250 to about 1500 comprises:

A. adding one of a first primary amine and an α,β-unsaturated ketone, aldehyde, or first nitrile to the other in a reactor by delayed addition mode at about 40° C. to 80° C. in a ketone, aldehyde, or first nitrile to first primary amine molar ratio of about 0.6:1 to about 2.2:1 to form an intermediate ketone, aldehyde, or first nitrile;

B. adding the intermediate ketone, aldehyde, or first nitrile to a first liquid phase containing a second primary amine at about 70° C. to about 150° C. in a weight ratio of about 0.1:1 to about 0.75:1 of the second primary amine to the total intermediate ketone, aldehyde, or first nitrile feed, in the presence of a hydrogenation catalyst and hydrogen at a pressure of about 1.38 to about 20.7 MPa (about 200 to about 3000 psig) to form a secondary diamine polymer, wherein the second primary amine can be the same as or different from the first primary amine;

C. adding one of the secondary diamine polymer and an α,β-unsaturated second nitrile to the other in a reactor by delayed addition mode at about 40° C. to 80° C. in a second nitrile to secondary diamine polymer molar ratio of about 0.6:1 to about 3:1 to form bis-cyanoethylated compounds, wherein the second nitrile can be the same as or different from the first nitrile; and D. adding the bis-cyanoethylated compounds to a second liquid phase at about 70° C. to about 150° C. in the presence of a hydrogenation catalyst and hydrogen at a pressure of about 1.38 to about 20.7 MPa (about 200 to about 3000 psig) to form the polymeric amine composition.

These methods result in a polymeric amine composition which comprises amine compounds having the formula (I), wherein:

each $R^A$ independently is an unsubstituted $C_5$-$C_6$ cycloalkyl or a substituted or unsubstituted $C_1$-$C_{12}$ linear or branched alkyl, wherein the substituents on the alkyl independently are —N(CH$_3$)$_2$, —N(CH$_2$CH$_3$)$_2$,

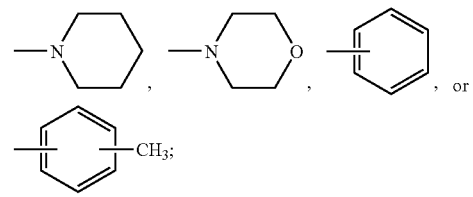

each $R^B$ independently is an unsubstituted $C_3$-$C_8$ linear or branched alkanediyl or

wherein p and q independently are 1, 2, 3, 4, 5, or 6;
X is $R^C$—NH$_2$;
$R^C$ is an unsubstituted $C_3$-$C_{10}$ linear or branched alkanediyl or

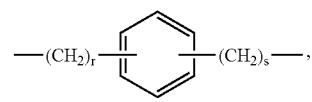

wherein r and s independently are 1 or 2; and
n is an integer in a range from 0 to 50; inclusive.
General reaction schemes for Step A, in view of the respective initial reactant, are illustrated below:

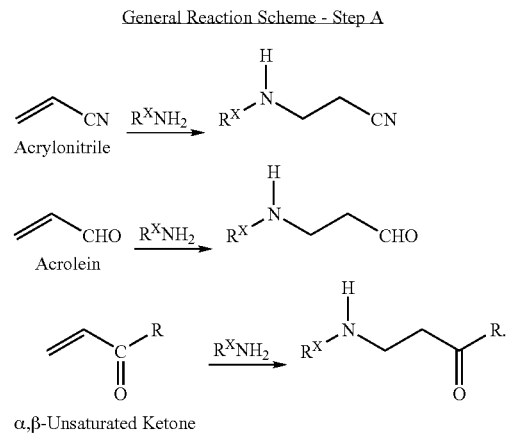

Primary amines suitable for use as the first primary amine include, but are not limited to, methylamine, ethylamine, propylamine, butylamine, pentylamine, hexylamine, heptylamine, octylamine, 2-ethylhexylamine, cyclohexylamine (CHA), ethanolamine, dimethylaminopropylamine (DMAPA), diethylaminopropylamine, aminoethylpiperazine, aminoethylmorpholine, N-aminoethyl-N'-methylpiperazine, or aminopropyldiethanolamine, and the like, or any combination thereof. Non-limiting examples of α,β-unsaturated ketone or aldehyde compounds include acetylacetone, methyl vinyl ketone, or acrolein, and the like, or any combination thereof. Suitable α,β-unsaturated first nitrites include, but are not limited to, acrylonitrile, malononitrile, adiponitrile, or xylylene dicyanide, and the like, or any combination thereof. Delayed addition mode, as used herein, indicates that one reactant is added slowly to the other reactant over a period of several hours. For instance, the first primary amine is added to the first nitrile over the period of 4 hours in Example 1.

General reaction schemes for Step B, in view of the respective intermediate, are illustrated below:

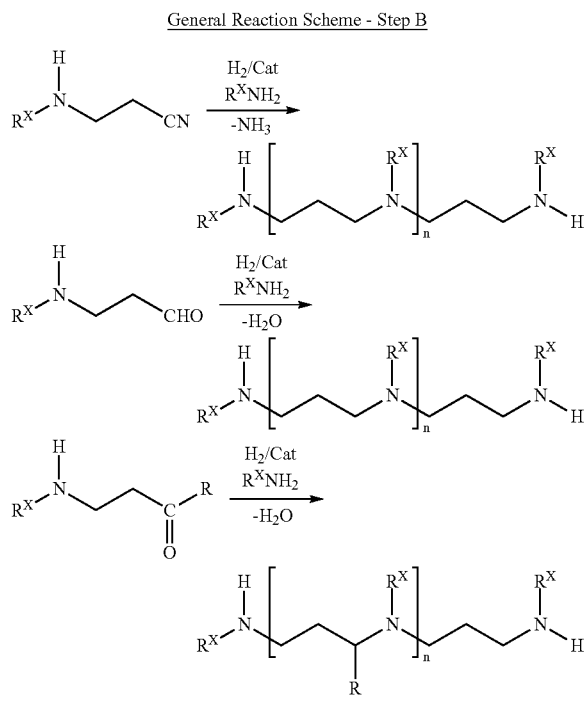

The intermediate ketone, aldehyde, or first nitrile of Step A is reacted with a second primary amine in Step B. The second primary amine can be the same as the first primary amine as illustrated in the general reaction scheme above. Alternatively, the second primary amine used in Step B can be different from the first primary amine used in Step A. Suitable hydrogenation catalysts are well known to those of skill in the art and include, but are not limited to, Pt, Pd, Rh, Ru, Ni, or Co, and the like, or any combination thereof. The catalyst quantity that is useful in Step B depends on the relative amount of metal versus the weight of the support of the catalyst. For the Pd/Al$_2$O$_3$ catalyst used in Example 1, a suitable weight percent of total catalyst based on the total intermediate nitrite feed is generally in a range from about 0.75% to about 5%. The resultant product of Step B is a secondary diamine polymer. Methods to produce a secondary diamine polymer are also disclosed in U.S. patent application Ser. No. 11/584,388, filed on Oct. 20, 2006, which is incorporated herein by reference in its entirety.

In one aspect of the present invention, the secondary diamine polymer of Step B is reacted with an α,β-unsaturated second nitrile in Step C and hydrogenated in Step D. The second nitrile can be the same as or different from the first nitrile used in Step A. Suitable second nitriles include, but are not limited to, acrylonitrile, malononitrile, adiponitrile, or xylylene dicyanide, and the like, or any combination thereof. The second nitrile in Step C of Example 1 is acrylonitrile. The hydrogenation catalyst in Step D can be the same as used in Step B or different. Example 1 uses a cobalt hydrogenation catalyst in Step D.

The procedure described above can be used to produce polymeric amine compositions having a $M_n$ from about 250 to about 1500. In order to produce polymeric amine compositions having a $M_n$ above 500 or 1000, the ketone, aldehyde, or first nitrile to first primary amine molar ratio can be in a range from about 1.8:1 to about 2.1 in Step A. In Step B, the weight ratio of the second primary amine to the total intermediate ketone, aldehyde, or first nitrile feed, is in a range from about 0.1:1 to about 0.25:1. In this aspect, the temperature in Step B should be maintained in the 90 to 140° C. range.

One skilled in the art will also recognize that there is an alternate method to produce the secondary diamine polymer that results from Steps A and B above. This alternate method involves contacting an aliphatic or aromatic dinitrile with a primary amine under reducing conditions, such as in the presence of hydrogen and a suitable metal hydrogenation catalyst. The reaction schemes below illustrate two non-limiting examples of this alternate process using methylamine as the primary amine and an appropriate dinitrile:

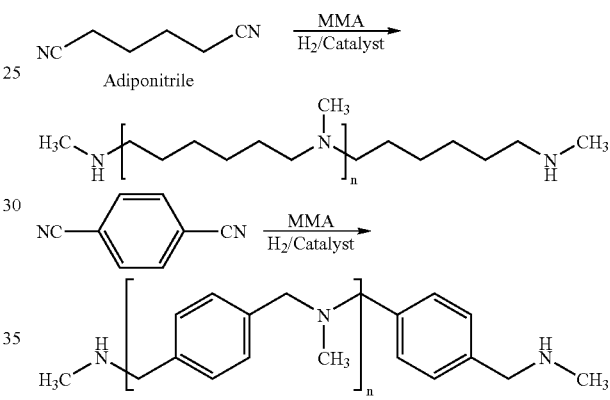

The resultant secondary diamine polymer can then be further processed in accordance with Steps C and D noted above to produce a polymeric amine composition of the present invention.

Another aspect of the present invention is exemplified in Constructive Examples 11-13. In Step C, oxygen-containing moieties, such as ethylene oxide, propylene oxide, and glycidyl ethers, are reacted with the secondary diamine polymer. Step D is not employed in this aspect of the invention. The resultant polymeric amine composition comprises amine compounds having hydroxyl functionality.

In yet another aspect of the present invention, Step C is a reductive alkylation reaction of the secondary diamine polymer with an aldehyde in the presence of hydrogen. Step D is not employed in this aspect of the invention. For example, those of skill in the art would recognize that by reacting a secondary diamine polymer with formaldehyde, the result is a methyl group for the $R^E$—H moiety in formula (I). Likewise, $R^E$ is an unsubstituted $C_2$, $C_3$, or $C_4$ linear alkanediyl, when the reactant is ethanal (acetaldehyde), propanal (propionaldehyde), or butanal (butyraldehyde), respectively.

If desired, derivatives of the amine compounds in the polymeric amine composition can be employed for the practice of this invention. Such derivatives include polyamide derivatives, amidoamine derivatives, amine-epoxy adduct derivatives, and combinations thereof. These derivatives are well-known to those skilled in the art.

Multifunctional Amine

Compositions in accordance with the present invention can comprise at least one multifunctional amine. Multifunctional amine, as used herein, describes compounds with amine functionality and which contain two (2) or more active amine hydrogens. In another aspect, the multifunctional amine can contain three (3) or more active amine hydrogen.

It can be beneficial to limit the volatility of the specific multifunctional amine used in some applications where worker exposure and safety issues may arise. Thus, in one aspect of the present invention, the at least one multifunctional amine contains 6 or more carbon atoms. In another aspect, the at least one multifunctional amine contains 8 or more carbon atoms. In yet another aspect, the at least one multifunctional amine contains 12 or more carbon atoms.

Non-limiting examples of multifunctional amines that are within the scope of the present invention include, but are not limited to, an aliphatic amine, a cycloaliphatic amine, an aromatic amine, a Mannich base derivative of an aliphatic amine, a cycloaliphatic amine, or an aromatic amine, a polyamide derivative of an aliphatic amine, a cycloaliphatic amine, or an aromatic amine, an amidoamine derivative of an aliphatic amine, a cycloaliphatic amine, or an aromatic amine, an amine adduct derivative of an aliphatic amine, a cycloaliphatic amine, or an aromatic amine, and the like, or any combination thereof.

More than one multifunctional amine can be used in the compositions of the present invention. For example, the at least one multifunctional amine can comprise an aliphatic amine and a Mannich base derivative of a cycloaliphatic amine. Also, the at least one multifunctional amine can comprise one aliphatic amine and one different aliphatic amine.

Exemplary aliphatic amines include polyethylene amines (triethylenetetramine, tetraethylenepentamine, pentaethylenehexamine and the like), 1,6-hexanediamine, 3,3,5-trimethyl-1,6-hexanediamine, 3,5,5-trimethyl-1,6-hexanediamine, 2-methyl-1,5-pentanediamine (commercially available as Dytek-A), bis-(3-aminopropyl)amine, N,N'-bis-(3-aminopropyl)-1,2-ethanediamine, aminoethylpiperazine, and the like, or combinations thereof. Additionally, the poly(alkylene oxide) diamines and triamines commercially available under the Jeffamine name from Huntsman Corporation, are useful in the present invention. Illustrative examples include, but are not limited to, Jeffamine® D-230, Jeffamine® D-400, Jeffamine® D-2000, Jeffamine® D-4000, Jeffamine® T-403, Jeffamine® EDR-148, Jeffamine® EDR-192, Jeffamine® C-346, Jeffamine® ED-600, Jeffamine® ED-900, Jeffamine® ED-2001, and the like, or combinations thereof.

Cycloaliphatic and aromatic amines include, but are not limited to, 1,2-diaminocyclohexane, 1,3-diaminocyclohexane, 1,4-diaminocyclohexane, hydrogenated ortho-toluenediamine, hydrogenated meta-toluenediamine, metaxylylene diamine, hydrogenated metaxylylene diamine (referred to commercially as 1,3-BAC), isophorone diamine, various isomers or norbornane diamine, 3,3'-dimethyl-4,4'-diaminodicyclohexyl methane, 4,4'-diaminodicyclohexyl methane, 2,4'-diaminodicyclohexyl methane, a mixture of methylene bridged poly(cyclohexyl-aromatic)amines, and the like, or combinations thereof. The mixture of methylene bridged poly(cyclohexyl-aromatic)amines is abbreviated as either MBP-CAA or MPCA, and is described in U.S. Pat. No. 5,280,091, which is incorporated herein by reference in its entirety. In one aspect of the present invention, the at least one multifunctional amine is a mixture of methylene bridged poly(cyclohexyl-aromatic)amines (MPCA).

Mannich base derivatives can be made by the reaction of the above described aliphatic amines, cycloaliphatic amines, or aromatic amines with phenol or a substituted phenol and formaldehyde. An exemplary substituted phenol used to make Mannich bases with utility in the present invention is cardanol, which is obtained from cashew nut shell liquid. Alternatively, Mannich bases can be prepared by an exchange reaction of a multifunctional amine with a tertiary amine containing a Mannich base, such as tris-dimethylaminomethylphenol (commercially available as Ancamine® $K_{54}$ from Air Products and Chemicals, Inc.) or bis-dimethylaminomethylphenol. Polyamide derivatives can be prepared by the reaction of an aliphatic amine, cycloaliphatic amine, or aromatic amine with dimer fatty acid, or mixtures of a dimer fatty acid and a fatty acid. Amidoamine derivatives can be prepared by the reaction of an aliphatic amine, cycloaliphatic amine, or aromatic amine with fatty acids. Amine adducts can be prepared by the reaction of an aliphatic amine, cycloaliphatic amine, or aromatic amine with an epoxy resin, for example, with the diglycidyl ether of bisphenol-A, the diglycidyl ether of bisphenol-F, or epoxy novolac resins. The aliphatic, cycloaliphatic, and aromatic amines also can be adducted with monofunctional epoxy resins, such as phenyl glycidyl ether, cresyl glycidyl ether, butyl glycidyl ether, other alkyl glycidyl ethers, and the like.

Multifunctional Epoxy Resin

Amine-epoxy compositions of the present invention comprise an epoxy component, the epoxy component comprising at least one multifunctional epoxy resin. Multifunctional epoxy resin, as used herein, describes compounds containing 2 or more 1,2-epoxy groups per molecule. Epoxide compounds of this type are described in Y. Tanaka, "Synthesis and Characteristics of Epoxides", in C. A. May, ed., *Epoxy Resins Chemistry and Technology* (Marcel Dekker, 1988), which is incorporated herein by reference.

One class of epoxy resins suitable for use in the present invention comprise the glycidyl ethers of polyhydric phenols, including the glycidyl ethers of dihydric phenols. Illustrative examples include, but are not limited to, the glycidyl ethers of resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl)propane, 2,2-bis-(4-hydroxyphenyl)-propane (commercially known as bisphenol A), bis-(4-hydroxyphenyl)-methane (commercially known as bisphenol F, and which may contain varying amounts of 2-hydroxyphenyl isomers), and the like, or any combination thereof. Additionally, advanced dihydric phenols of the following structure also are useful in the present invention:

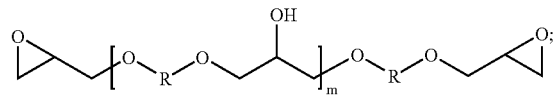

where m is an integer, and R is a divalent hydrocarbon radical of a dihydric phenol, such as those dihydric phenols listed above. Materials according to this formula can be prepared by polymerizing mixtures of a dihydric phenol and epichlorohydrin, or by advancing a mixture of a diglycidyl ether of the dihydric phenol and the dihydric phenol. While in any given molecule the value of m is an integer, the materials are invariably mixtures which can be characterized by an average value of m which is not necessarily a whole number. Polymeric materials with an average value of m between 0 and about 7 can be used in one aspect of the present invention.

In another aspect, epoxy novolac resins, which are the glycidyl ethers of novolac resins, can be used as multifunctional epoxy resins in accordance with the present invention. In yet another aspect, the at least one multifunctional epoxy resin is a diglycidyl ether of bisphenol-A (DGEBA), an advanced or higher molecular weight version of DGEBA, a diglycidyl ether of bisphenol-F, an epoxy novolac resin, or any combination thereof. Higher molecular weight versions or derivatives of DGEBA are prepared by the advancement process, where excess DGEBA is reacted with bisphenol-A to yield epoxy terminated products. The epoxy equivalent weights (EEW) for such products ranges from about 450 to 3000 or more. Because these products are solid at room temperature, they are often referred to as solid epoxy resins.

DGEBA or advanced DGEBA resins are often used in coating formulations due to a combination of their low cost and generally high performance properties. Commercial grades of DGEBA having an EEW ranging from about 174 to about 250, and more commonly from about 185 to about 195, are readily available. At these low molecular weights, the epoxy resins are liquids and are often referred to as liquid epoxy resins. It is understood by those skilled in the art that most grades of liquid epoxy resin are slightly polymeric, since pure DGEBA has an EEW of 174. Resins with EEW's between 250 and 450, also generally prepared by the advancement process, are referred to as semi-solid epoxy resins because they are a mixture of solid and liquid at room temperature.

Depending upon the end-use application, it can be beneficial to reduce the viscosity of the compositions of the present invention by modifying the epoxy component. For example, the viscosity can be reduced to allow an increase in the level of pigment in a formulation or composition while still permitting easy application, or to allow the use of a higher molecular weight epoxy resin. Thus, it is within the scope of the present invention for the epoxy component, which comprises at least one multifunctional epoxy resin, to further comprise a monofunctional epoxide. Examples of monoepoxides include, but are not limited to, styrene oxide, cyclohexene oxide, ethylene oxide, propylene oxide, butylene oxide, and the glycidyl ethers of phenol, cresols, tert-butylphenol, other alkyl phenols, butanol, 2-ethylhexanol, $C_4$ to $C_{14}$ alcohols, and the like.

Miscellaneous Additives

Compositions of the present invention can be used to produce various articles of manufacture. Depending on the requirements during the manufacturing of or for the end-use application of the article, various additives can be employed in the formulations and compositions to tailor specific properties. These additives include, but are not limited to, solvents, accelerators, plasticizers, fillers, fibers such as glass or carbon fibers, pigments, pigment dispersing agents, rheology modifiers, thixotropes, flow or leveling aids, defoamers, or any combination thereof. It is understood that other mixtures or materials that are known in the art can be included in the compositions or formulations and are within the scope of the present invention.

Further, compositions within the scope of the present invention can be solventless, also referred to as solvent-free or 100% solids. Alternatively, these compositions can further comprise at least one solvent (a solvent is also referred to as a diluent). Often, a solvent or mixture of solvents is chosen to give a specific evaporation rate profile for the composition or formulation, while maintaining solubility of the components of the formulation.

Articles

The present invention also is directed to articles of manufacture comprising the compositions disclosed herein. For example, an article can comprise an amine-epoxy composition which comprises the contact product of a polymeric amine curing agent composition and an epoxy component. The polymeric amine curing agent composition comprises amine compounds having the formula (I). The polymeric amine curing agent composition can further comprise at least one multifunctional amine. The epoxy component comprises at least one multifunctional epoxy resin. Optionally, various additives can be present in the compositions or formulations used to produce fabricated articles, dependent upon the desired properties. These additives can include, but are not limited to, solvents, accelerators, plasticizers, fillers, fibers such as glass or carbon fibers, pigments, pigment dispersing agents, rheology modifiers, thixotropes, flow or leveling aids, defoamers, or any combination thereof.

Articles in accordance with the present invention include, but are not limited to, a coating, an adhesive, a construction product, a flooring product, or a composite product. Coatings based on these amine-epoxy compositions can be solvent-free or can contain solvents or diluents as needed for the particular application. For example, coatings with solids content greater than 50%, greater than 65%, greater than 75%, or greater than 85%, are within the scope of the present invention. Coatings can contain various types and levels of pigments for use in paint applications.

Numerous substrates are suitable for the application of coatings of this invention with proper surface preparation, as is well known to one of ordinary skill in the art. Such substrates include, but are not limited to, concrete and various types of metals and alloys, such as steel and aluminum.

Coatings of this invention can be applied by any number of techniques including spray, brush, roller, paint mitt, and the like. In order to apply very high solids content or 100% solids coatings of this invention, plural component spray application equipment can be used, in which the amine and epoxy components are mixed in the lines leading to the spray gun, in the spray gun itself, or by mixing the two components together as they leave the spray gun. Using this technique can alleviate limitations with regard to the pot life of the formulation, which typically decreases as both the amine reactivity and the solids content increases. Heated plural component equipment can be employed to reduce the viscosity of the components, thereby improving ease of application.

Construction and flooring applications include compositions comprising the amine-epoxy compositions of the present invention in combination with concrete or other materials commonly used in the construction industry. Compositions of the present invention can be used in the construction of epoxy-based floors, often in applications requiring better mechanical properties (e.g., improved tensile strength or improved compressive strength) or better elongation than that normally obtained from cementitious or other similar types of flooring materials. Crack injection and crack filling products also can be prepared from the compositions disclosed herein, as well as polymer modified cements, tile grouts, and the like. Non-limiting examples of composite products or articles comprising amine-epoxy compositions disclosed herein include tennis rackets, skis, bike frames, airplane wings, glass fiber reinforced composites, and other molded products.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one or ordinary skill in the art without departing from the spirit of the present invention or the scope of the appended claims.

Example 1

Synthesis of a Polymeric Amine Composition Utilizing Acrylonitrile and Methylamine as Initial Reactants The first step in the synthesis (Step A, described above) is illustrated by the following reaction scheme. The first primary amine is methylamine (MMA, $MeNH_2$) and the α,β-unsaturated ketone, aldehyde, or first nitrile is acrylonitrile.

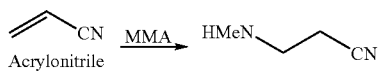

329 g (6.2 moles) of acrylonitrile and 10 g of water were placed in a 1-liter stainless-steel batch pressure reactor equipped with a stirrer. The reactor was sealed and subsequently purged with nitrogen to remove air from the reactor. While stirring the reactor contents, 232 g (7.5 moles) of methylamine were added to the reactor over a time period of 4 hours. During the addition of the methylamine, the reactor temperature was maintained in the range of 55-60° C. This temperature range was then maintained for 1.5 hours after the methylamine addition was complete. The reactor was cooled and the intermediate product, $HMeN(CH_2)_2CN$, was removed.

Step B is illustrated by the following reaction scheme, where methylamine is the second primary amine:

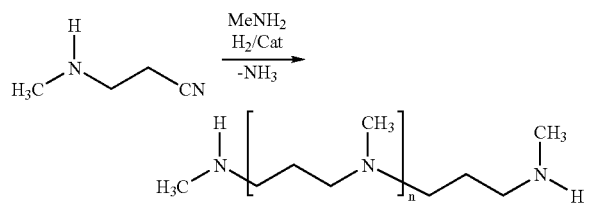

100 g of isopropanol and 5.6 g of a 5% $Pd/Al_2O_3$ catalyst were placed in a 1-liter stainless-steel batch pressure reactor equipped with a stirrer and 1-liter hydrogen ballast tank. The $Pd/Al_2O_3$ catalyst is commercially available from the Johnson-Mathey Corporation as Standard Grade powder. Alternatively, a 5% Pd/C catalyst can be used in place of the 5% $Pd/Al_2O_3$ catalyst. The reactor was sealed and subsequently purged with nitrogen and hydrogen to remove air from the reactor. While stirring the reactor contents, 100 g of anhydrous methylamine were added to the reactor. The reactor was then pressurized with hydrogen to 5.5 MPa (800 psi), and heated to 120° C. Over a 5-hour period, 375 g of the intermediate product described above were added to the reactor. Substantially constant reactor conditions were maintained for 2 hours after the addition of the intermediate product was complete, at which time the rate of hydrogen uptake from the ballast tank fell below 0.0034 MPa/min (about 0.5 psi/min). The reactor was cooled to room temperature and depressurized, and the reaction product was filtered to remove the catalyst. The solvent was then removed by rotary evaporation. The resulting reaction product was a secondary diamine polymer, methylamine-terminated poly-(N-methylazetidine). The $M_n$ was determined to be approximately 194 using the GC technique described above. Methylamine-terminated poly-(N-methylazetidine) has the following chemical structure:

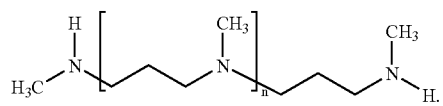

The methylamine-terminated poly-(N-methylazetidine) compound of Example 1 was analyzed using GC and had the following polymer distribution by area percent, with "others" representing reaction by-products which were not separated or identified using GC, nor used in determining $M_n$:

| | |
|---|---|
| n = 0 | 14% |
| n = 1 | 26% |
| n = 2 | 21% |
| n = 3 | 15% |
| n = 4 | 7% |
| n = 5 | 4% |
| Others | 13% |

Steps C and D in the synthesis are illustrated by the following reaction scheme using the secondary diamine polymer produced above as the starting material. Step C reacts the secondary diamine polymer with an α,β-unsaturated second nitrile (acrylonitrile) to form bis-cyanoethylated compounds. Step D is a hydrogenation reaction of the bis-cyanoethylated product to form the polymeric amine composition of the present invention.

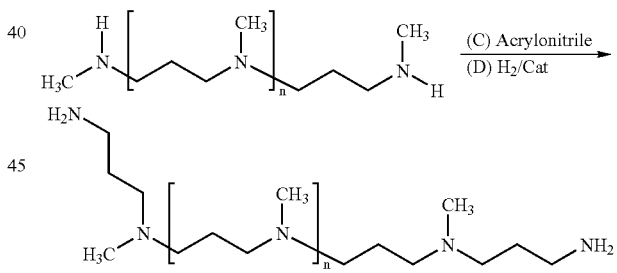

In Step C, 300 g of the secondary diamine polymer produced in Step B and 7.5 g of water were placed in a 1-liter stainless-steel batch pressure reactor equipped with a stirrer. The reactor was sealed and subsequently purged with nitrogen to remove any air from the reactor. While stirring the reactor contents, 68 g of acrylonitrile were added to the reactor over a period of 4 hours. During the addition of the acrylonitrile, the reactor temperature was maintained in a range of 55-60° C. This temperature range was then maintained for 1.5 hours after the acrylonitrile addition was complete. The reactor was cooled and the bis-cyanoethylated product removed.

Step D is the hydrogenation reaction referred to above. 125 g of isopropanol and 5 g of a Raney Cobalt catalyst were placed in a 1-liter stainless-steel batch pressure reactor equipped with a stirrer and 1-liter hydrogen ballast tank. The Raney Cobalt catalyst is commercially available from Grace as a promoted grade containing 0.5-5% chromium (promoted), 78-96% cobalt, and 0.5-5% nickel. The reactor was sealed and subsequently purged with nitrogen and hydrogen to remove air from the reactor. The reactor was then pressurized with hydrogen to 5.5 MPa (800 psi), and heated to 120° C. Over a period of 4 hours, 330 g of the bis-cyanoethylated product of Step C were added to the stirred reactor. Substantially constant reactor conditions were maintained for approximately 2 more hours after the addition of the bis-cyanoethylated product was complete, at which time the rate of hydrogen uptake from the ballast tank fell below 0.0034 MPa/min (about 0.5 psi/min). The reactor was cooled to room temperature and depressurized, and the reaction product was filtered to remove the catalyst. The solvent was then removed by rotary evaporation.

The resulting polymeric amine composition comprised primary amine compounds having the following structure:

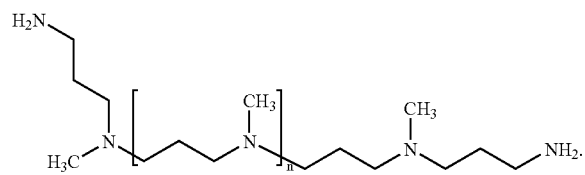

With the distribution of "n" shown above, the polymeric amine composition of Example 1 had a $M_n$ of approximately 350. The AHEW was approximately 90.

Constructive Example 2

Constructive Synthesis of a Polymeric Amine Composition Utilizing Acrylonitrile and Dimethylaminopropylamine (DMAPA) as Initial Reactants Constructive Example 2 substantially employs the procedures and reaction schemes detailed in Example 1, with the exception of the reactants and conditions recited herein. Constructive Example 2 employs DMAPA as the first primary amine and acrylonitrile as the α,β-unsaturated ketone, aldehyde, or first nitrile.

In Step A, approximately 250-350 g acrylonitrile are reacted with DMAPA at a nitrile to amine molar ratio of about 0.6:1 to about 2.2:1. Water is present in the reactor at about 2-4% by weight of the acrylonitrile. During the delayed addition of the DMAPA, the reactor temperature is maintained in a range of about 40° C. to about 80° C. This temperature range is maintained for approximately 1-2 hours after completion of the DMAPA addition. The resultant intermediate nitrile product is $Me_2N(CH_2)_3NH(CH_2)_2CN$.

Step B is illustrated by the following reaction scheme, where DMAPA is the second primary amine:

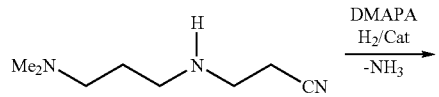

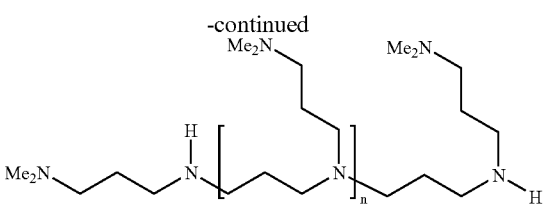

About 100-150 g of isopropanol and about 5-10 g of a $Pd/Al_2O_3$ catalyst are placed in a stirred reactor equipped with a 1-liter hydrogen ballast tank. While stirring, about 90-150 g of DMAPA are added to the reactor. The reactor then is pressurized with hydrogen in a range of about 1.38 to about 20.7 MPa (about 200 to about 3000 psig) and heated to a temperature in a range of about 70° C. to about 150° C. Over a period of about 4-5 hours, the intermediate nitrile product described above is added to the reactor. The weight ratio of the DMAPA to the total intermediate nitrile feed is in a weight ratio of about 0.1:1 to about 0.75:1. Substantially constant reactor conditions are maintained for approximately 30 minutes to 2 hours after the addition of the intermediate product is complete, at which time the rate of hydrogen uptake from the ballast tank should fall below about 0.0034 MPa/min (about 0.5 psi/min). Catalyst and solvent are removed, resulting in a secondary diamine polymer. The distribution of molecular sizes and the $M_n$ for the resultant secondary diamine polymer can then be determined using the GC technique previously described or other analytical technique, such as GPC.

In Step C, about 250-350 g of the secondary diamine polymer produced in Step B are reacted with an α,β-unsaturated second nitrile at a nitrile to diamine polymer molar ratio of about 0.6:1 to about 3:1. The α,β-unsaturated second nitrile can be acrylonitrile as in Example 1, or other α,β-unsaturated nitrile, such as, for example, malononitrile, adiponitrile, or xylylene dicyanide. Water is present in the reactor at about 2-4% by weight based on the secondary diamine polymer. During the delayed addition of the second nitrile, the reactor temperature is maintained in a range of about 40° C. to about 80° C. This temperature range is maintained for approximately 1-2 hours after completion of the second nitrile addition. After cooling, the bis-cyanoethylated product is removed.

Step D is a hydrogenation reaction. About 100-150 g of isopropanol and about 5-10 g of a hydrogenation catalyst are placed in a stirred reactor equipped with a 1-liter hydrogen ballast tank. The reactor then is pressurized with hydrogen in a range of about 1.38 to about 20.7 MPa (about 200 to about 3000 psig) and heated to a temperature in a range of about 70° C. to about 150° C. Over a period of about 4-5 hours, about 250-350 g of the bis-cyanoethylated product of Step C is added to the reactor. Substantially constant reactor conditions are maintained for approximately 30 minutes to 2 hours after the addition of the bis-cyanoethylated product is complete, at which time the rate of hydrogen uptake from the ballast tank should fall below about 0.0034 MPa/min (about 0.5 psi/min). Catalyst and solvent are removed, resulting in a polymeric amine composition. The distribution of molecular sizes, the $M_n$, and the AHEW for the resultant polymeric amine composition then can be determined by techniques known to those of ordinary skill in the art.

Constructive Example 3

Constructive Synthesis of a Polymeric Amine Composition Utilizing Acrylonitrile and Cyclohexylamine (CHA) as Initial Reactants Constructive Example 3 substantially employs the procedures and reaction schemes detailed in Constructive Example 2, with the exception that CHA is used instead of DMAPA as the first primary amine and the second primary amine. Constructive Example 3 employs acrylonitrile as the α,β-unsaturated ketone, aldehyde, or first nitrile.

In Step A, acrylonitrile and CHA are reacted to produce the following intermediate nitrile compound:

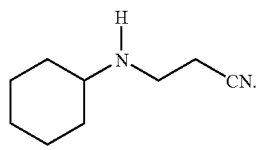 [SMILES: N#CCCNC1CCCCC1]

Step B is illustrated by the following reaction scheme, where CHA is the second primary amine:

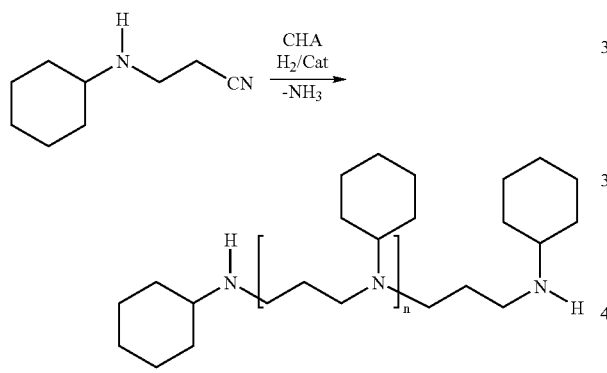

The secondary diamine polymer is then reacted with an α,β-unsaturated second nitrile (acrylonitrile) in Step C, followed by the hydrogenation reaction of Step D. The distribution of molecular sizes, the $M_n$, and the AHEW for the resultant polymeric amine composition then can be determined by techniques known to those of ordinary skill in the art.

Constructive Example 4

Constructive Synthesis of a Polymeric Amine Composition Utilizing Acrylonitrile and Aminoethylmorpholine as Initial Reactants Constructive Example 4 substantially employs the procedures and reaction schemes detailed in Constructive Example 2, with the exception that aminoethylmorpholine is used instead of DMAPA as the first primary amine and the second primary amine. Constructive Example 3 employs acrylonitrile as the α,β-unsaturated ketone, aldehyde, or first nitrile.

Acrylonitrile and aminoethylmorpholine are reacted in Step A. Aminoethylmorpholine is the second primary amine in Step B, as illustrated by the following reaction scheme:

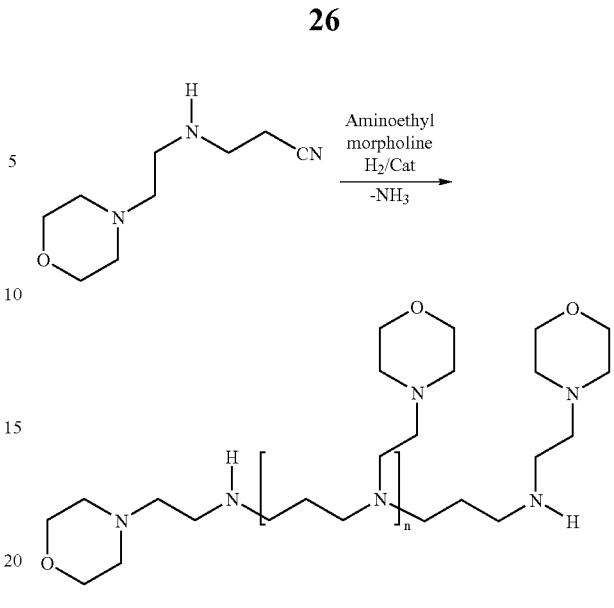

The secondary diamine polymer is then reacted with an α,β-unsaturated second nitrile (acrylonitrile) in Step C, followed by the hydrogenation reaction of Step D. The distribution of molecular sizes, the $M_n$, and the AHEW for the resultant polymeric amine composition then can be determined by techniques known to those of ordinary skill in the art.

Constructive Example 5

Constructive Synthesis of a Polymeric Amine Composition Utilizing Acrolein and Methylamine as Initial Reactants Constructive Example 5 substantially employs the procedures and reaction schemes detailed in Constructive Example 2, with the exception that methylamine is used instead of DMAPA as the first primary amine and the second primary amine, and acrolein is used instead of acrylonitrile as the α,β-unsaturated ketone, aldehyde, or first nitrile.

In Step A, acrolein and methylamine are reacted to produce the intermediate aldehyde product, HMeN(CH$_2$)$_2$CHO. Step B is illustrated by the following reaction scheme, where methylamine is the second primary amine:

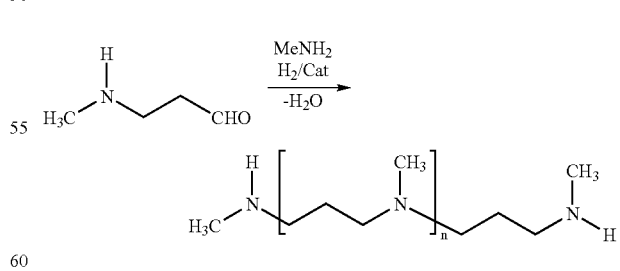

The secondary diamine polymer is then reacted with an α,β-unsaturated second nitrile (acrylonitrile) in Step C, followed by the hydrogenation reaction of Step D. The distribution of molecular sizes, the $M_n$, and the AHEW for the resultant polymeric amine composition then can be determined by techniques known to those of ordinary skill in the art.

Constructive Example 6

Constructive Synthesis of a Polymeric Amine Composition Utilizing Acrolein and Dimethylaminopropylamine (DMAPA) as Initial Reactants Constructive Example 6 substantially employs the procedures and reaction schemes detailed in Constructive Example 2, with the exception that acrolein is used instead of acrylonitrile as the α,β-unsaturated ketone, aldehyde, or first nitrile.

In Step A, acrolein and DMAPA are reacted to produce the intermediate aldehyde product, $Me_2N(CH_2)_3NH(CH_2)_2CHO$. Step B is illustrated by the following reaction scheme, where DMAPA is the second primary amine:

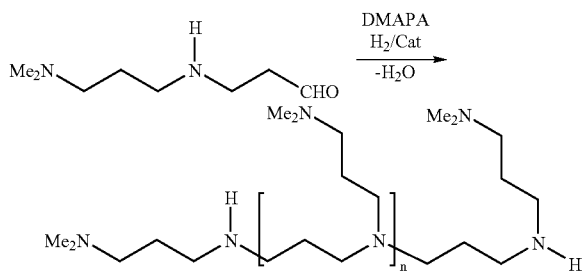

The secondary diamine polymer is then reacted with an α,β-unsaturated second nitrite (acrylonitrile) in Step C, followed by the hydrogenation reaction of Step D. The distribution of molecular sizes, the $M_n$, and the AHEW for the resultant polymeric amine composition then can be determined by techniques known to those of ordinary skill in the art.

Constructive Example 7

Constructive Synthesis of a Polymeric Amine Composition Utilizing Acrolein and Cyclohexylamine (CHA) as Initial Reactants Constructive Example 7 substantially employs the procedures and reaction schemes detailed in Constructive Example 3, with the exception that acrolein is used instead of acrylonitrile as the α,β-unsaturated ketone, aldehyde, or first nitrile.

In Step A, acrolein and CHA are reacted to produce the following intermediate aldehyde compound:

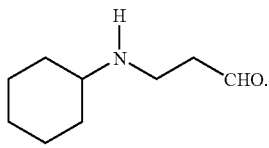 [SMILES: O=CCCNC1CCCCC1]

Step B is illustrated by the following reaction scheme, where CHA is the second primary amine:

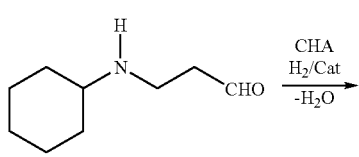

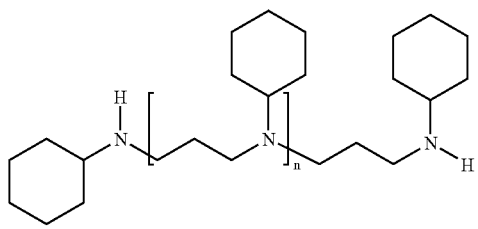

The secondary diamine polymer is then reacted with an α,β-unsaturated second nitrile (acrylonitrile) in Step C, followed by the hydrogenation reaction of Step D. The distribution of molecular sizes, the $M_n$, and the AHEW for the resultant polymeric amine composition then can be determined by techniques known to those of ordinary skill in the art.

Constructive Example 8

Constructive Synthesis of a Polymeric Amine Composition Utilizing an α,β-Unsaturated Ketone and Methylamine as Initial Reactants Constructive Example 8 substantially employs the procedures and reaction schemes detailed in Constructive Example 5, with the exception that an α,β-unsaturated ketone is used instead of acrolein as the α,β-unsaturated ketone, aldehyde, or first nitrile.

In Step A, an α,β-unsaturated ketone and methylamine are reacted to produce the an intermediate ketone product, as illustrated in the following reaction scheme:

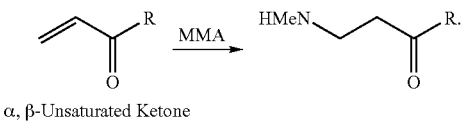

α, β-Unsaturated Ketone

R represents a $C_1$-$C_5$ linear alkyl in this example. Step B is illustrated by the following reaction scheme, where MMA is the second primary amine:

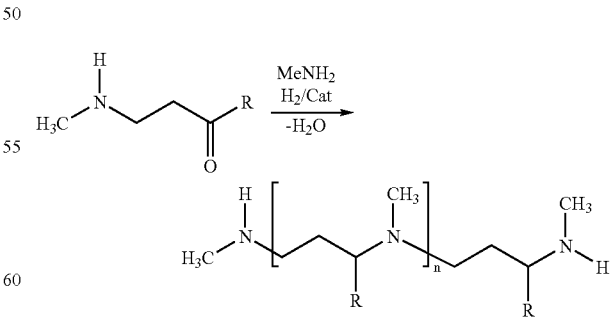

As illustrated below, the secondary diamine polymer is then reacted with an α,β-unsaturated second nitrile (acrylonitrile) in Step C, followed by the hydrogenation reaction of Step D:

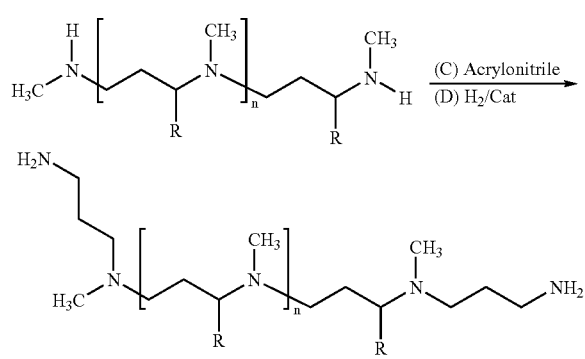

The distribution of molecular sizes, the $M_n$, and the AHEW for the resultant polymeric amine composition then can be determined by techniques known to those of ordinary skill in the art.

Constructive Example 9

Constructive synthesis of a polymeric amine composition utilizing an α,β-unsaturated ketone and DMAPA as initial reactants.

Constructive Example 9 substantially employs the procedures and reaction schemes detailed in Constructive Example 6, with the exception that an α,β-unsaturated ketone is used instead of acrolein as the α,β-unsaturated ketone, aldehyde, or first nitrile.

In Step A, an α,β-unsaturated ketone and DMAPA are reacted to produce an intermediate ketone product, as illustrated in the following reaction scheme:

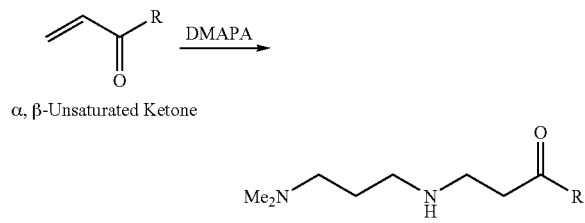

R represents a $C_1$-$C_5$ linear alkyl in this example. Step B is illustrated by the following reaction scheme, where DMAPA is the second primary amine:

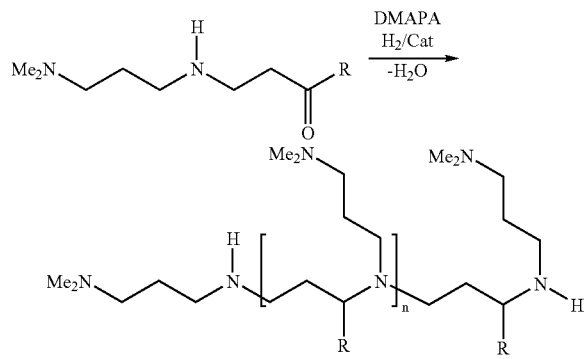

The secondary diamine polymer is then reacted with an α,β-unsaturated second nitrile (acrylonitrile) in Step C, followed by the hydrogenation reaction of Step D. The distribution of molecular sizes, the $M_n$, and the AHEW for the resultant polymeric amine composition then can be determined by techniques known to those of ordinary skill in the art.

Constructive Example 10

Constructive Synthesis of a Polymeric Amine Composition Utilizing an α,β-Unsaturated Ketone and CHA as Initial Reactants Constructive Example 10 substantially employs the procedures and reaction schemes detailed in Constructive Example 7, with the exception that an α,β-unsaturated ketone is used instead of acrolein as the α,β-unsaturated ketone, aldehyde, or first nitrile.

In Step A, an α,β-unsaturated ketone and CHA are reacted to produce an intermediate ketone product, as illustrated in the following reaction scheme:

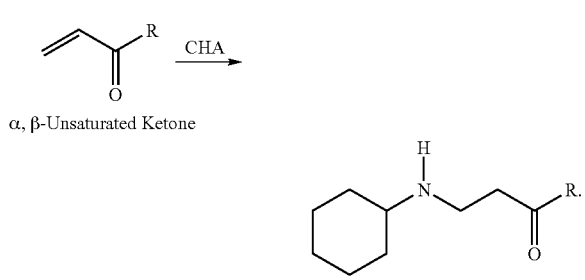

R represents a $C_1$-$C_5$ linear alkyl in this example. Step B is illustrated by the following reaction scheme, where CHA is the second primary amine:

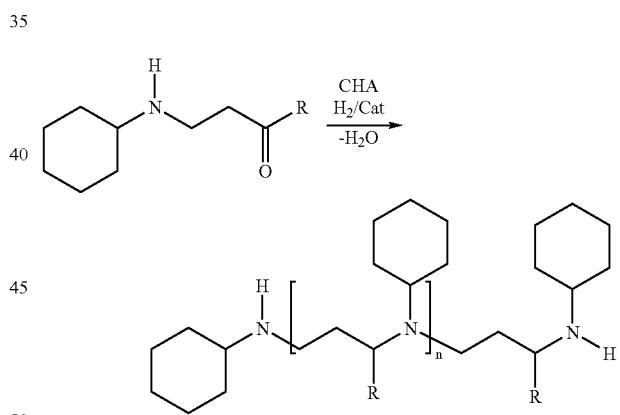

The secondary diamine polymer is then reacted with an α,β-unsaturated second nitrile (acrylonitrile) in Step C, followed by the hydrogenation reaction of Step D. The distribution of molecular sizes, the $M_n$, and the AHEW for the resultant polymeric amine composition then can be determined by techniques known to those of ordinary skill in the art.

Constructive Example 11

Constructive Synthesis of a Polymeric Amine Composition Wherein Ethylene Oxide is Used in Step C Constructive Example 11 substantially employs the procedures and reaction schemes detailed in Example 1, Steps A and B, to produce the secondary diamine polymer with the following chemical structure:

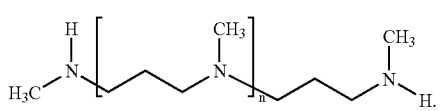

Constructive Example 11 substantially employs the procedures and reaction schemes detailed in Step C in Example 1, with the exception of the reactants and conditions recited herein. In Step C of Constructive Example 11, about 250-350 g of the secondary diamine polymer produced in Step B are reacted with ethylene oxide at a ethylene oxide to diamine polymer molar ratio of about 0.6:1 to about 3:1. Water is present in the reactor at 2-4% by weight based on the secondary diamine polymer. During the addition of the ethylene oxide of a period of 4 hours, the reactor temperature is maintained in a range of 40° C. to 80° C. This temperature range is maintained for 1-2 hours after completion of the ethylene oxide addition. After cooling, the polymeric amine composition is removed.

The resulting polymeric amine composition comprises amine compounds having the following structure:

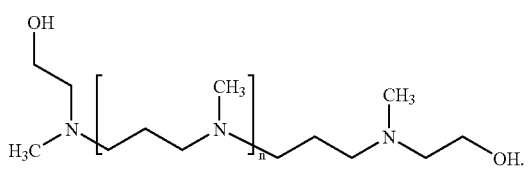

The distribution of molecular sizes, the $M_n$, and the AHEW for the resultant polymeric amine composition then can be determined by techniques known to those of ordinary skill in the art.

Constructive Example 12

Constructive Synthesis of a Polymeric Amine Composition Wherein Propylene Oxide is Used in Step C Constructive Example 12 substantially employs the procedures and reaction schemes detailed in Constructive Example 11, with the exception that propylene oxide is used instead of ethylene oxide as the reactant in Step C.

The resulting polymeric amine composition comprises amine compounds having the following structure:

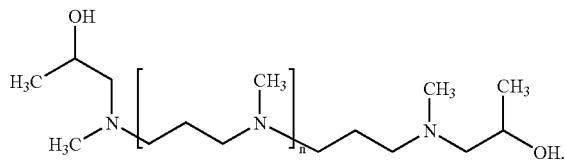

The distribution of molecular sizes, the $M_n$, and the AHEW for the resultant polymeric amine composition then can be determined by techniques known to those of ordinary skill in the art.

Constructive Example 13

Constructive Synthesis of a Polymeric Amine Composition Wherein a Glycidyl Ether is Used in Step C Constructive Example 13 substantially employs the procedures and reaction schemes detailed in Constructive Example 11, with the exception that a glycidyl ether is used instead of ethylene oxide as the reactant in Step C.

The glycidyl ether has the following structure:

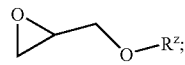

wherein $R^Z$ is a phenyl group or an unsubstituted $C_1$-$C_{18}$ linear or branched alkyl.

The resulting polymeric amine composition comprises amine compounds having the following structure:

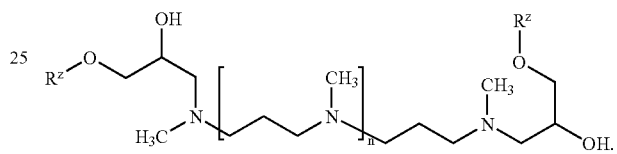

The distribution of molecular sizes, the $M_n$, and the AHEW for the resultant polymeric amine composition then can be determined by techniques known to those of ordinary skill in the art.

We claim:

1. An amine curing agent composition comprising:
   (i) a polymeric amine composition comprising amine compounds having the formula:

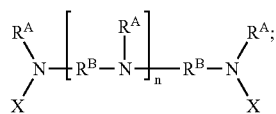

wherein:
   each $R^A$ is a methyl group;
   each $R^B$ is an unsubstituted $C_3$ linear alkanediyl;
   each X is $R^C$—$NH_2$;
   $R^C$ is an unsubstituted $C_3$ linear alkanediyl;
   the polymeric amine composition has a number-average molecular weight ($M_n$) from about 250 to about 1500; and
   n is an integer in a range from 0 to 10, inclusive; and
   (ii) at least one multifunctional amine having 2 or more active amine hydrogens.

2. The composition of claim 1, wherein the at least one multifunctional amine has 3 or more active amine hydrogens and 6 or more carbon atoms.

3. The composition of claim 1, wherein the at least one multifunctional amine is an aliphatic amine, a cycloaliphatic amine, an aromatic amine, a Mannich base derivative of an aliphatic amine, a cycloaliphatic amine, or an aromatic amine, a polyamide derivative of an aliphatic amine, a cycloaliphatic amine, an aromatic amine, an amidoamine derivative of an aliphatic amine, a cycloaliphatic amine, or an aromatic amine, an amine adduct derivative of an aliphatic amine, a cycloaliphatic amine, or an aromatic amine, or any combination thereof.

4. The composition of claim 1, wherein the at least one multifunctional amine is a mixture of methylene bridged poly(cyclohexyl-aromatic)amines.

5. The composition of claim 1, wherein the polymeric amine composition has a $M_n$ from about 300 to about 800.

6. The composition of claim 1, wherein the multifunctional amine comprises a multifunctional amine having 3 or more active amine hydrogens.

7. The composition of claim 1 further comprising an epoxy component comprising at least one multifunctional epoxy resin.

8. The composition of claim 7, wherein the stoichiometric ratio of epoxy groups in the epoxy component to reactive hydrogens in the polymeric amine composition ranges from about 1.5:1 to about 1:1.5.

9. The composition of claim 7, wherein the stoichiometric ratio of epoxy groups in the epoxy component to reactive hydrogens in the polymeric amine composition ranges from about 1.3:1 to about 1:1.3.

* * * * *